US011793608B2

(12) United States Patent
Derakhshan et al.

(10) Patent No.: US 11,793,608 B2
(45) Date of Patent: *Oct. 24, 2023

(54) SYSTEMS AND METHODS FOR CORRECTING MALOCCLUSIONS OF TEETH

(71) Applicant: ALIGN TECHNOLOGY, INC., San Jose, CA (US)

(72) Inventors: Mitra Derakhshan, Herndon, VA (US); Crystal Tjhia, Sunnyvale, CA (US); Rohit Tanugula, San Jose, CA (US); Yaser Shanjani, Sunnyvale, CA (US); Ryan Kimura, San Jose, CA (US); Bruce Cam, San Jose, CA (US); Eric Yau, Saratoga, CA (US); Yuxiang Wang, San Jose, CA (US); Ken Wu, San Jose, CA (US); Peter Webber, Redwood City, CA (US); Jun Sato, San Jose, CA (US); John Y. Morton, San Jose, CA (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 17/525,669

(22) Filed: Nov. 12, 2021

(65) Prior Publication Data
US 2022/0071743 A1 Mar. 10, 2022

Related U.S. Application Data

(63) Continuation of application No. 16/176,860, filed on Oct. 31, 2018.
(Continued)

(51) Int. Cl.
*A61C 7/36* (2006.01)
*A61C 7/10* (2006.01)
(Continued)

(52) U.S. Cl.
CPC ............. *A61C 7/36* (2013.01); *A61C 7/002* (2013.01); *A61C 7/08* (2013.01); *A61C 7/10* (2013.01);
(Continued)

(58) Field of Classification Search
CPC .. A61C 7/36; A61C 7/002; A61C 7/08; A61C 7/10; B33Y 50/02; B29C 64/386;
(Continued)

(56) References Cited

U.S. PATENT DOCUMENTS 5,324,196 A  6/1994  Magill
5,820,368 A  10/1998  Wolk
(Continued)

FOREIGN PATENT DOCUMENTS

JP  2005161081 A  6/2005
JP  2010528748 A  8/2010
(Continued)

*Primary Examiner* — Ralph A Lewis
*Assistant Examiner* — Mirayda A Aponte
(74) *Attorney, Agent, or Firm* — FISHERBROYLES, LLP

(57) ABSTRACT

A system for correcting class III malocclusions is disclosed. The system may include a maxilla appliance having tooth receiving cavities shaped to receive teeth of the maxilla and a first coupling for receiving an elastic. The system may also include a mandibular appliance having tooth receiving cavities shaped to receive teeth of the mandible. In some embodiments, the system includes a class III corrective appliance having a first mount shaped to engage with the mandibular arch of the patient and having a second coupling shaped to receive the elastic.

20 Claims, 12 Drawing Sheets

Related U.S. Application Data

(60) Provisional application No. 62/580,362, filed on Nov. 1, 2017.

(51) Int. Cl.
*A61C 7/00* (2006.01)
*A61C 7/08* (2006.01)
B29C 64/386 (2017.01)
B29C 64/106 (2017.01)
B29C 64/40 (2017.01)
B33Y 50/02 (2015.01)
B29L 31/00 (2006.01)

(52) U.S. Cl.
CPC .......... *B29C 64/106* (2017.08); *B29C 64/386* (2017.08); *B29C 64/40* (2017.08); *B29L 2031/7536* (2013.01); *B33Y 50/02* (2014.12)

(58) Field of Classification Search
CPC ....... B29C 64/40; B29C 64/106; B29C 64/30; B29C 64/10; B29L 2031/7536; B29L 2031/7532; B29L 2031/753
USPC .......................................................... 433/19
See application file for complete search history.

(56) References Cited

U.S. PATENT DOCUMENTS

| | | |
|---|---|---|
| 6,386,864 B1 | 5/2002 | Kuo |
| 6,454,565 B2 | 9/2002 | Phan et al. |
| 6,471,511 B1 | 10/2002 | Chishti et al. |
| 6,607,382 B1 | 8/2003 | Kuo et al. |
| 6,783,604 B2 | 8/2004 | Tricca |
| 6,790,035 B2 | 9/2004 | Tricca et al. |
| 6,814,574 B2 | 11/2004 | Abolfathi et al. |
| 6,947,038 B1 | 9/2005 | Anh et al. |
| 7,074,039 B2 | 7/2006 | Kopelman et al. |
| 7,104,792 B2 | 9/2006 | Taub et al. |
| 7,160,107 B2 | 1/2007 | Kopelman et al. |
| 7,192,273 B2 | 3/2007 | McSurdy, Jr. |
| 7,347,688 B2 | 3/2008 | Kopelman et al. |
| 7,448,514 B2 | 11/2008 | Wen |
| 7,481,121 B1 | 1/2009 | Cao |
| 7,543,511 B2 | 6/2009 | Kimura et al. |
| 7,553,157 B2 | 6/2009 | Abolfathi et al. |
| 7,600,999 B2 | 10/2009 | Knopp |
| 7,658,610 B2 | 2/2010 | Knopp |
| 7,766,658 B2 | 8/2010 | Tricca et al. |
| 7,771,195 B2 | 8/2010 | Knopp et al. |
| 7,854,609 B2 | 12/2010 | Chen et al. |
| 7,871,269 B2 | 1/2011 | Wu et al. |
| 7,878,801 B2 | 2/2011 | Abolfathi et al. |
| 7,878,805 B2 | 2/2011 | Moss et al. |
| 7,883,334 B2 | 2/2011 | Li et al. |
| 7,914,283 B2 | 3/2011 | Kuo |
| 7,947,508 B2 | 5/2011 | Tricca et al. |
| 8,152,518 B2 | 4/2012 | Kuo |
| 8,172,569 B2 | 5/2012 | Matty et al. |
| 8,235,715 B2 | 8/2012 | Kuo |
| 8,292,617 B2 | 10/2012 | Brandt et al. |
| 8,337,199 B2 | 12/2012 | Wen |
| 8,401,686 B2 | 3/2013 | Moss et al. |
| 8,517,726 B2 | 8/2013 | Kakavand et al. |
| 8,562,337 B2 | 10/2013 | Kuo et al. |
| 8,684,729 B2 | 4/2014 | Wen |
| 8,708,697 B2 | 4/2014 | Li et al. |
| 8,758,009 B2 | 6/2014 | Chen et al. |
| 8,771,149 B2 | 7/2014 | Rahman et al. |
| 8,899,976 B2 | 12/2014 | Chen et al. |
| 8,899,977 B2 | 12/2014 | Cao et al. |
| 8,936,463 B2 | 1/2015 | Mason et al. |
| 8,936,464 B2 | 1/2015 | Kopelman |
| 9,022,781 B2 | 5/2015 | Kuo et al. |
| 9,119,691 B2 | 9/2015 | Namiranian et al. |
| 9,241,774 B2 | 1/2016 | Li et al. |
| 9,326,831 B2 | 5/2016 | Cheang |
| 9,433,476 B2 | 9/2016 | Khardekar et al. |
| 9,610,141 B2 | 4/2017 | Kopelman et al. |
| 9,655,691 B2 | 5/2017 | Li et al. |
| 9,675,427 B2 | 6/2017 | Kopelman |
| 9,700,385 B2 | 7/2017 | Webber |
| 9,744,001 B2 | 8/2017 | Choi et al. |
| 10,045,835 B2 | 8/2018 | Boronkay et al. |
| 10,150,244 B2 | 12/2018 | Sato et al. |
| 10,201,409 B2 | 2/2019 | Mason et al. |
| 10,363,116 B2 | 7/2019 | Boronkay |
| 10,383,705 B2 | 8/2019 | Shanjani et al. |
| D865,180 S | 10/2019 | Bauer et al. |
| 10,449,016 B2 | 10/2019 | Kimura et al. |
| 10,463,452 B2 | 11/2019 | Matov et al. |
| 10,470,847 B2 | 11/2019 | Shanjani et al. |
| 10,492,888 B2 | 12/2019 | Chen et al. |
| 10,517,701 B2 | 12/2019 | Boronkay |
| 10,537,463 B2 | 1/2020 | Kopelman |
| 10,548,700 B2 | 2/2020 | Fernie |
| 10,555,792 B2 | 2/2020 | Kopelman et al. |
| 10,613,515 B2 | 4/2020 | Cramer et al. |
| 10,639,134 B2 | 5/2020 | Shanjani et al. |
| 10,743,964 B2 | 8/2020 | Wu et al. |
| 10,758,323 B2 | 9/2020 | Kopelman |
| 10,781,274 B2 | 9/2020 | Liska et al. |
| 10,813,720 B2 | 10/2020 | Grove et al. |
| 10,874,483 B2 | 12/2020 | Boronkay |
| 10,881,487 B2 | 1/2021 | Cam et al. |
| 10,959,810 B2 | 3/2021 | Li et al. |
| 10,993,783 B2 | 5/2021 | Wu et al. |
| 11,026,831 B2 | 6/2021 | Kuo |
| 11,045,282 B2 | 6/2021 | Kopelman et al. |
| 11,045,283 B2 | 6/2021 | Riley et al. |
| 11,103,330 B2 | 8/2021 | Webber et al. |
| 11,123,156 B2 | 9/2021 | Cam et al. |
| 11,154,382 B2 | 10/2021 | Kopelman et al. |
| 11,166,788 B2 | 11/2021 | Webber |
| 11,174,338 B2 | 11/2021 | Liska et al. |
| 11,219,506 B2 | 1/2022 | Shanjani et al. |
| 11,259,896 B2 | 3/2022 | Matov et al. |
| 11,273,011 B2 | 3/2022 | Shanjani et al. |
| 11,278,375 B2 | 3/2022 | Wang et al. |
| 11,318,667 B2 | 5/2022 | Mojdeh et al. |
| 11,331,166 B2 | 5/2022 | Morton et al. |
| 11,344,385 B2 | 5/2022 | Morton et al. |
| 2002/0192617 A1 | 12/2002 | Phan et al. |
| 2004/0166462 A1 | 8/2004 | Phan et al. |
| 2004/0166463 A1 | 8/2004 | Wen et al. |
| 2005/0014105 A1 | 1/2005 | Abolfathi et al. |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0115782 A1 | 6/2006 | Li et al. |
| 2006/0115785 A1 | 6/2006 | Li et al. |
| 2006/0199142 A1 | 9/2006 | Liu et al. |
| 2006/0234179 A1 | 10/2006 | Wen et al. |
| 2007/0092850 A1 | 4/2007 | Kaza |
| 2008/0118882 A1 | 5/2008 | Su |
| 2008/0160473 A1 | 7/2008 | Li et al. |
| 2008/0286716 A1 | 11/2008 | Sherwood |
| 2008/0286717 A1 | 11/2008 | Sherwood |
| 2009/0068617 A1 | 3/2009 | Lauren |
| 2009/0280450 A1 | 11/2009 | Kuo |
| 2010/0055635 A1 | 3/2010 | Kakavand |
| 2010/0129763 A1 | 5/2010 | Kuo |
| 2011/0269092 A1 | 11/2011 | Kuo et al. |
| 2013/0095446 A1 | 4/2013 | Andreiko et al. |
| 2013/0317800 A1 | 11/2013 | Wu et al. |
| 2014/0060549 A1 | 3/2014 | Lucas |
| 2014/0067334 A1 | 3/2014 | Kuo |
| 2014/0120490 A1* | 5/2014 | Borovinskih ............ A61C 7/36 433/24 |
| 2015/0157423 A1 | 6/2015 | Muslin |
| 2015/0265376 A1 | 9/2015 | Kopelman |
| 2015/0366638 A1 | 12/2015 | Kopelman et al. |
| 2016/0193014 A1 | 7/2016 | Morton et al. |

(56) References Cited

U.S. PATENT DOCUMENTS

| | | |
|---|---|---|
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007363 A1* | 1/2017 | Boronkay .............. G05B 15/02 |
| 2017/0007366 A1 | 1/2017 | Kopelman et al. |
| 2017/0007386 A1 | 1/2017 | Mason et al. |
| 2017/0135792 A1 | 5/2017 | Webber |
| 2017/0135793 A1 | 5/2017 | Webber et al. |
| 2017/0165032 A1 | 6/2017 | Webber et al. |
| 2018/0360567 A1 | 12/2018 | Xue et al. |
| 2018/0368944 A1 | 12/2018 | Sato et al. |
| 2019/0000592 A1 | 1/2019 | Cam et al. |
| 2019/0000593 A1 | 1/2019 | Cam et al. |
| 2019/0021817 A1 | 1/2019 | Sato et al. |
| 2019/0046297 A1 | 2/2019 | Kopelman et al. |
| 2019/0099129 A1 | 4/2019 | Kopelman et al. |
| 2019/0125494 A1 | 5/2019 | Li et al. |
| 2019/0125497 A1* | 5/2019 | Derakhshan ............. A61C 7/08 |
| 2019/0152152 A1 | 5/2019 | O'Leary et al. |
| 2019/0175304 A1 | 6/2019 | Morton et al. |
| 2019/0262101 A1 | 8/2019 | Shanjani et al. |
| 2019/0298494 A1 | 10/2019 | Webber et al. |
| 2019/0314119 A1 | 10/2019 | Kopelman et al. |
| 2019/0343606 A1 | 11/2019 | Wu et al. |
| 2020/0000553 A1 | 1/2020 | Makarenkova et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2020/0390523 A1 | 12/2020 | Sato et al. |
| 2021/0078357 A1 | 3/2021 | Venkatasanthanam et al. |
| 2021/0147672 A1 | 5/2021 | Cole et al. |

FOREIGN PATENT DOCUMENTS

| | | | |
|---|---|---|---|
| JP | 2011500142 A | 1/2011 | |
| WO | WO-0032131 A1 * | 6/2000 | ............... A61C 7/00 |
| WO | 2010087824 A1 | 8/2010 | |
| WO | WO-2011126854 A2 * | 10/2011 | ............... A61C 7/08 |

* cited by examiner

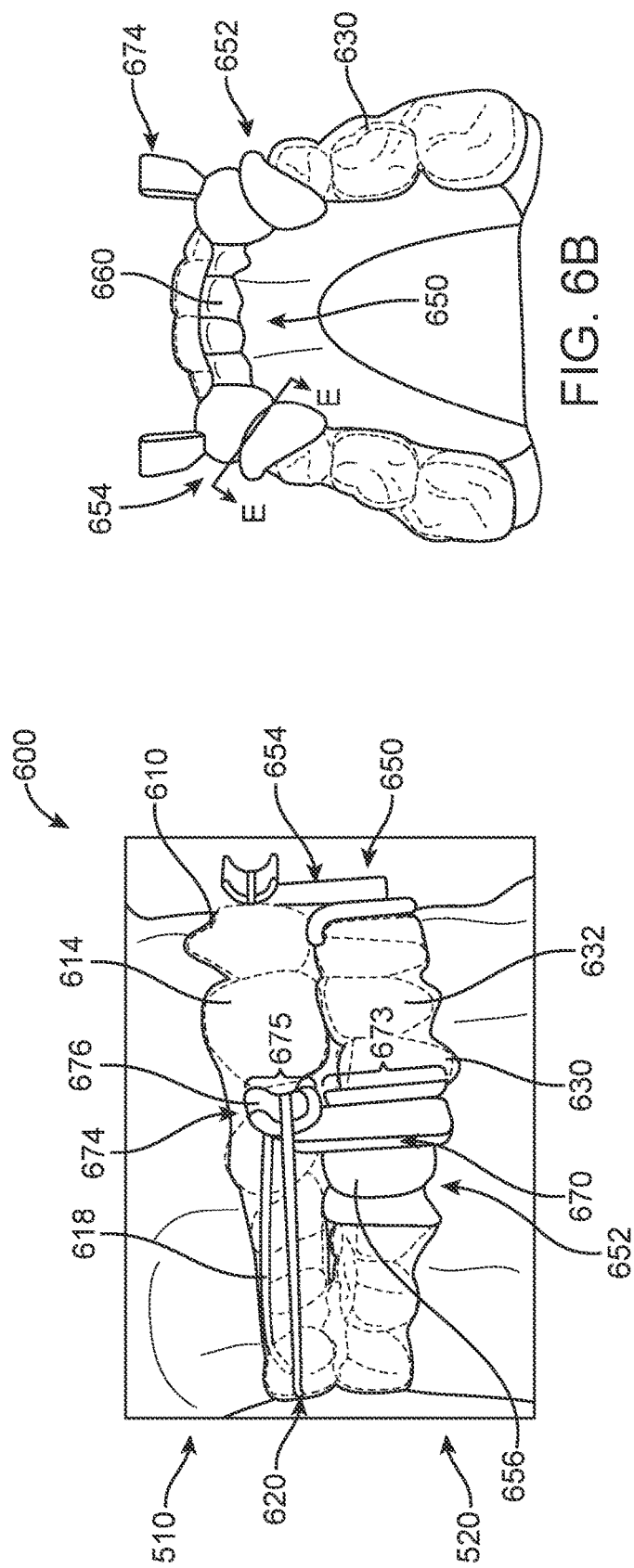
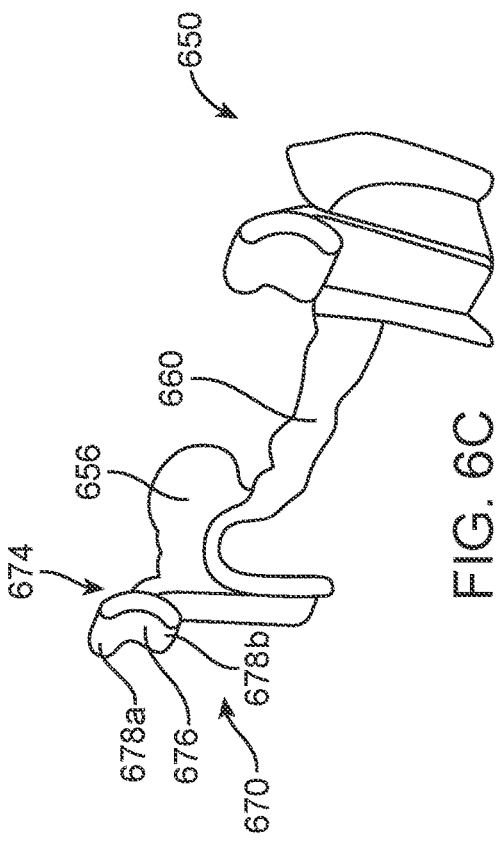

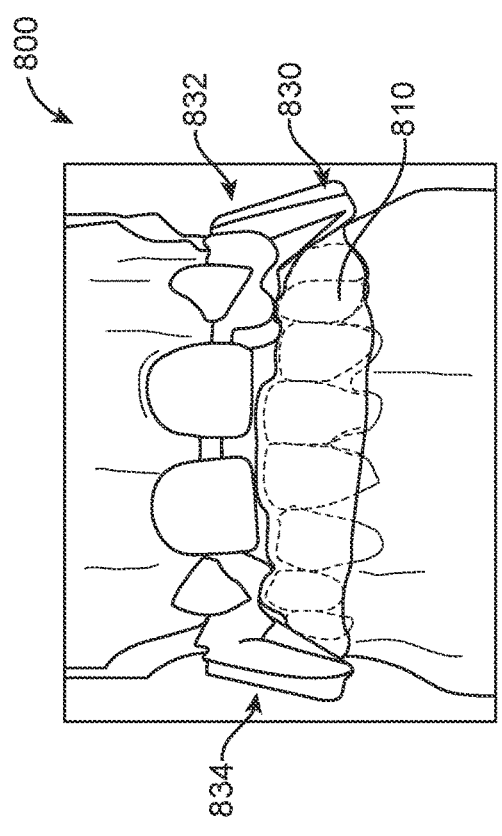
FIG. 8A
FIG. 8B
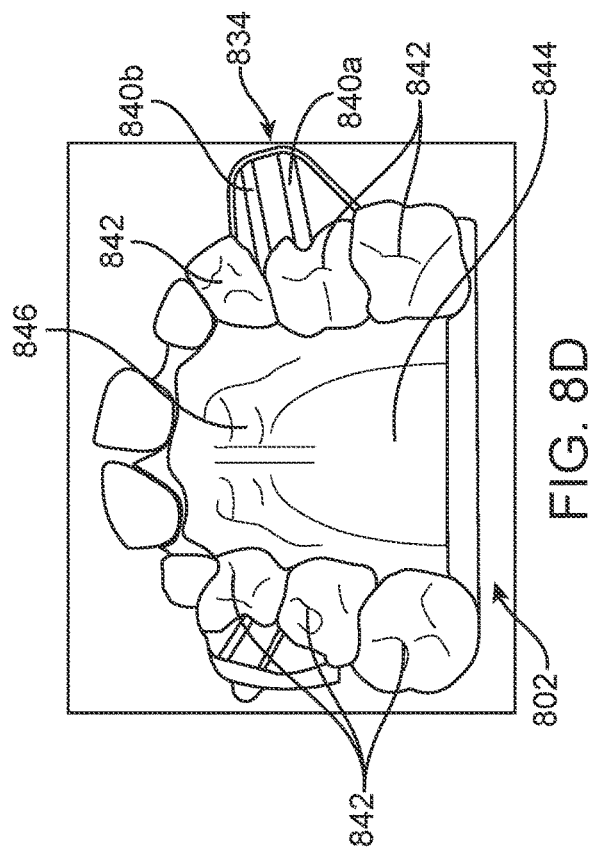
FIG. 8D
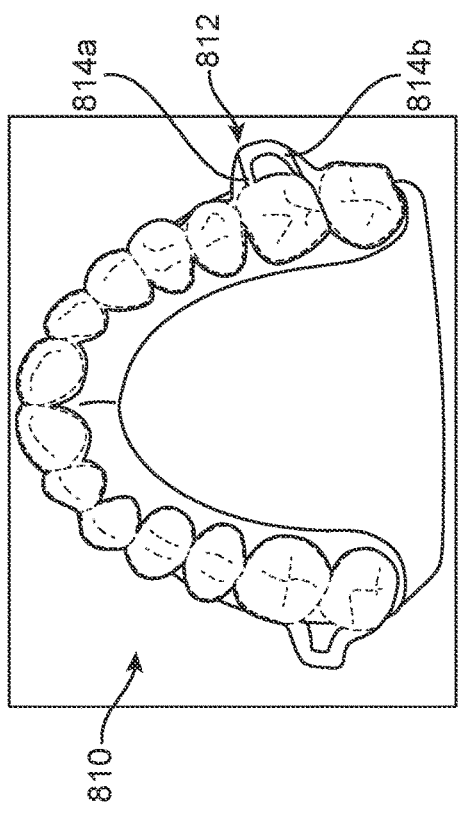
FIG. 8C

SYSTEMS AND METHODS FOR CORRECTING MALOCCLUSIONS OF TEETH

This application is a continuation of U.S. application Ser. No. 16/176,860 filed Oct. 31, 2018, which claims the benefit of U.S. Provisional Application No. 62/580,362, filed Nov. 1, 2017, each of which are incorporated herein by reference in their entirety.

BACKGROUND

In a class III malocclusion, the anterior teeth of the maxillary arch are posterior to the anterior teeth of the mandibular arch when the jaws are in a natural occlusion state. Class III malocclusions may also cause posterior teeth of the respective arches to have a cross bite malocclusion, such that the buccal cusp tips of posterior teeth of the upper arch rest inside the fossae of the lower teeth of the lower arch, instead of the cusp tips of the lower arch teeth resting inside the fossae of the teeth of the upper arch. Class III malocclusions may also be characterized by anterior cross bite, wherein the lower anterior teeth extend in front of (buccal to) the upper anterior teeth. Class III malocclusion causes an improper bite relationship between the teeth of the upper arch and the teeth of the lower arch. Class III and cross bite malocclusions may result in difficulty chewing and facial aesthetics that some people find undesirable. The systems described herein correct these and other malocclusions.

SUMMARY

A system for correcting malocclusions of a patient is disclosed. The system may include a maxillary appliance having tooth receiving cavities shaped to receive teeth of the maxilla and a first coupling a first distance above an occlusal plane of the patient for receiving an elastic. The system may also include a mandibular appliance having tooth receiving cavities shaped to receive teeth of the mandible. In some embodiments, the system includes a class III corrective appliance having a first mount shaped to engage with the mandibular arch of the patient and having a second coupling shaped to receive the elastic.

The system may also include a second mount shaped to engage with the mandibular arch of the patient, the first and second mounts shaped to engage with the mandibular arch of the patient at locations of respective first and second canines of the patient. In some embodiments, the system may also include a bridge extending between and connecting the first mount and the second mount, the bridge having a surface shaped to match a lingual facing anterior surface of the patient's mandibular arch. An arm may extend from the mount to a position above the occlusal surface of the mounts, the second coupling located at a terminal end of the arm and the second coupling may be the first distance above the occlusal plane of the patient.

In some embodiments the mount is shaped to engage with the mandibular arch of the patient at the central incisors and in some embodiments, the first coupling is located a first distance above the occlusal plane of the patient and the second coupling is located a second distance above the occlusal place of the patient, the first distance being equal to the second distance. The first coupling may be located a first distance above the occlusal plane of the patient and the second coupling may be located a second distance above the occlusal place of the patient. The first distance may be greater than the second distance.

The system may also include a guard attached to the arm and shaped to displace the lips or the cheeks of the patient away from the teeth of the patient. In some embodiments the system may include a first maxillary device extending from a buccal surface of the maxilla appliance and having a first engagement surface and a second mandibular device extending from a buccal surface of the mandibular appliance and having an engagement surface. In some embodiments, the engagement of the first engagement surface with the second engagement surface advances the maxilla of the patient in an anterior direction. The maxilla appliance may also be a transpalatal appliance and include a transpalatal extension that extends between the tooth receiving cavities of a left side of the maxilla appliance and the tooth receiving cavities of a right side of the maxilla appliance.

In some embodiments, the tooth receiving cavities of the maxilla appliance are shaped to reposition at least one tooth of the maxillary arch and the tooth receiving cavities of the mandibular appliance are shaped to reposition at least one tooth of the mandibular arch. The class III corrective appliance may be shaped to releasable couple to the mandibular appliance.

In some embodiments, the system includes a first class III appliance coupling at an external surface of the mandibular appliance and a second class III appliance coupling at a tooth facing surface of the class III appliance. The first class III appliance coupling and the second class III appliance coupling may be shaped to match each other and releasably couple the mandibular appliance to the class III appliance.

A system for correcting class III malocclusions of a patient is also disclosed. The system may include a maxillary appliance having tooth receiving cavities shaped to receive and reposition the teeth of the maxilla and a first coupling for receiving an elastic and a class III corrective appliance having tooth receiving cavities shaped to receive teeth of the mandible and a second coupling shaped to receive the elastic.

In some embodiments the system may include an arm extending from the class III corrective appliance to a position above the occlusal surface of the class III corrective appliance, the second coupling located at a terminal end of the arm. The arm may extend from a buccal surface of class III corrective appliance at the location of the central incisor. In some embodiments, the first coupling is located a first distance above the occlusal plane of the patient and the second coupling is located a second distance above the occlusal place of the patient, the first distance being equal to the second distance. In some embodiments, the first coupling may be located a first distance above the occlusal plane of the patient and the second coupling may be located a second distance above the occlusal place of the patient, the first distance being greater than the second distance. Also, the tooth receiving cavities of the maxilla appliance may be shaped to reposition at least one tooth of the maxillary arch and the tooth receiving cavities of the class III corrective appliance may be shaped to reposition at least one tooth of the mandibular arch.

The system may also include a guard attached to the arm and shaped to displace the lips or the cheeks of the patient away from the teeth of the patient. The system may also include a first maxillary device extending from a buccal surface of the maxilla appliance and having a first surface and a second maxillary device extending from a buccal surface of the class III corrective appliance and having an engagement surface, wherein the engagement of the first engagement surface with the second engagement surface advances the maxilla of the patient in an anterior direction.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 6a depicts an appliance system for correcting malocclusions of a patient installed on a patient, in accordance with one or more embodiments herein;

FIG. 6b depicts the mandibular or lower appliance of the appliance system of FIG. 6a, in accordance with one or more embodiments herein;

FIG. 6c depicts the class III correction appliance of FIG. 6a, in accordance with one or more embodiments herein;

FIG. 8a depicts a side view of an appliance system for correcting malocclusions of a patient installed on a patient, in accordance with one or more embodiments herein;

FIG. 8b depicts a front view of the appliance system of FIG. 8a, in accordance with one or more embodiments herein;

FIG. 8c depicts an occlusal view of the mandibular, or lower, appliance of FIG. 8a, in accordance with one or more embodiments herein;

FIG. 8d depicts an occlusal view of the maxilla, or upper, appliance of FIG. 8a, in accordance with one or more embodiments herein;

DETAILED DESCRIPTION

Figure 1A:
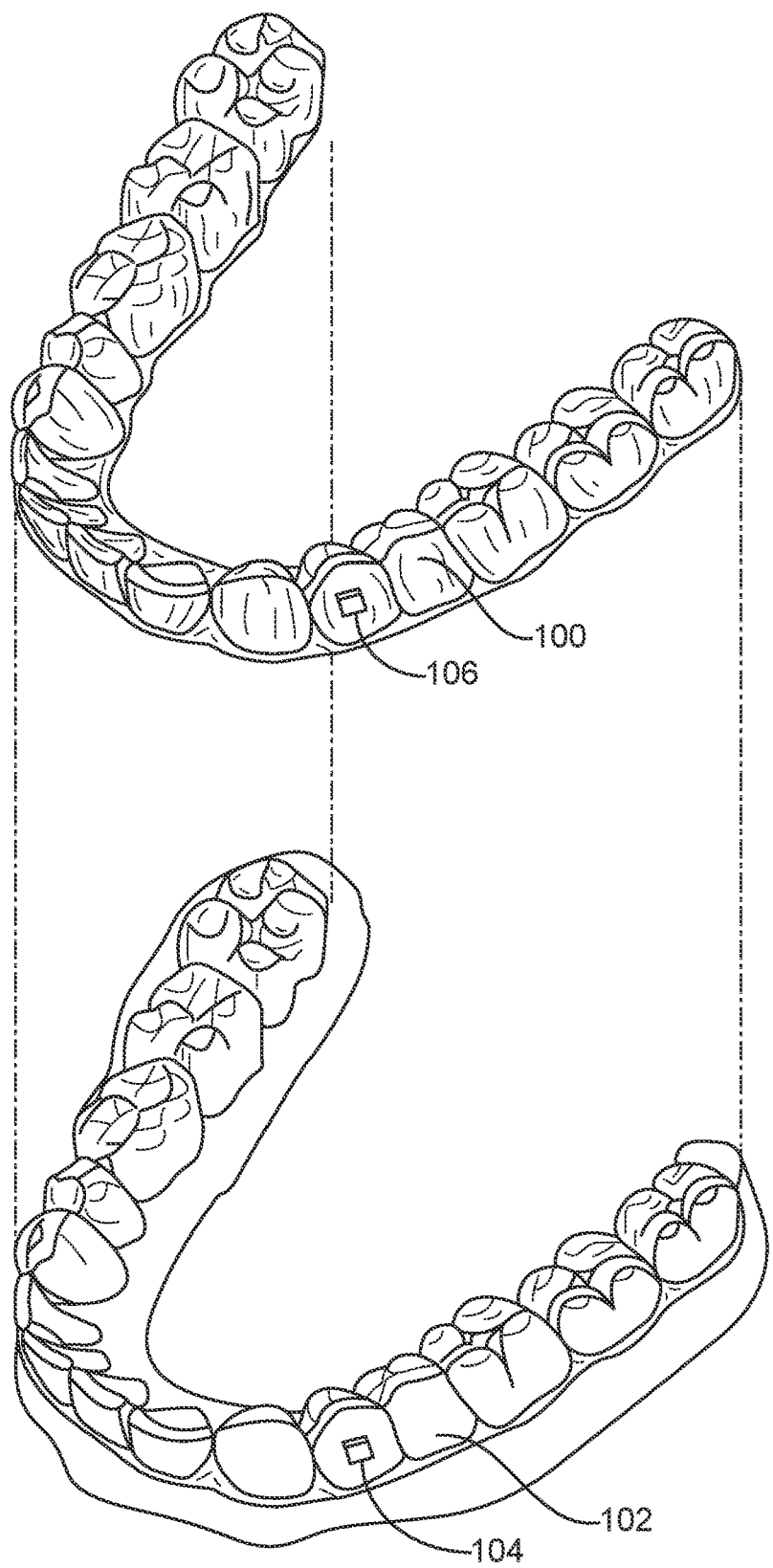
FIG. 1A illustrates a tooth repositioning appliance, in accordance with one or more embodiments herein.

A better understanding of the features and advantages of the present disclosure will be obtained by reference to the following detailed description that sets forth illustrative embodiments, in which the principles of embodiments of the present disclosure are utilized, and the accompanying drawings.

Although the detailed description contains many specifics, these should not be construed as limiting the scope of the disclosure but merely as illustrating different examples and aspects of the present disclosure. It should be appreciated that the scope of the disclosure includes other embodiments not discussed in detail above. Various other modifications, changes and variations which will be apparent to those skilled in the art may be made in the arrangement, operation and details of the methods, systems, and apparatus of the present disclosure provided herein without departing from the spirit and scope of the invention as described herein.

As used herein the terms "dental appliance," "orthodontic appliance," and "tooth receiving appliance" are treated synonymously.

As used herein the term "and/or" is used as a functional word to indicate that two words or expressions are to be taken together or individually. For example, A and/or B encompasses A alone, B alone, and A and B together.

As used herein a "plurality of teeth" encompasses two or more teeth. In some embodiments, one or more posterior teeth comprises one or more of a molar, a premolar or a canine, and one or more anterior teeth comprising one or more of a central incisor, a lateral incisor, a cuspid, a first bicuspid or a second bicuspid.

The embodiments disclosed herein are well suited for moving one or more teeth of the first group of one or more teeth or moving one or more of the second group of one or more teeth, and combinations thereof.

The embodiments disclosed herein are well suited for combination with one or more known commercially available tooth moving components such as attachments and polymeric shell appliances. In some embodiments, the appliance and one or more attachments are configured to move one or more teeth along a tooth movement vector comprising six degrees of freedom, in which three degrees of freedom are rotational and three degrees of freedom are translation.

The present disclosure provides orthodontic appliances and related systems, methods, and devices. Repositioning of teeth may be accomplished with the use of a series of removable elastic positioning appliances such as the Invisalign® system available from Align Technology, Inc., the assignee of the present disclosure. Such appliances may have a thin shell of elastic material that generally conforms to a patient's teeth but is slightly out of alignment with an initial or immediately prior tooth configuration. Placement of the appliance over the teeth applies controlled forces in specific locations to gradually move the teeth into the new configuration. Repetition of this process with successive appliances comprising new configurations eventually moves the teeth through a series of intermediate configurations or alignment patterns to a final desired configuration.

Although reference is made to an appliance comprising a polymeric shell appliance, the embodiments disclosed herein are well suited for use with many appliances that receive teeth, for example appliances without one or more of polymers or shells. The appliance can be fabricated with one or more of many materials such as metal, glass, reinforced fibers, carbon fiber, composites, reinforced composites, aluminum, biological materials, and combinations thereof for example. The appliance can be shaped in many ways, such as with thermoforming or direct fabrication as described herein, for example. Alternatively or in combination, the appliance can be fabricated with machining such as an appliance fabricated from a block of material with computer numeric control machining.

Turning now to the drawings, in which like numbers designate like elements in the various figures, FIG. 1A illustrates an exemplary tooth repositioning appliance or aligner 100 that can be worn by a patient in order to achieve an incremental repositioning of individual teeth 102 in the jaw. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using additive manufacturing techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some or most, and even all, of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Optionally, in cases involving more complex movements or treatment plans, it may be beneficial to utilize auxiliary components (e.g., features, accessories, structures, devices, components, and the like) in conjunction with an orthodontic appliance. Examples of such accessories include but are not limited to elastics, wires, springs, bars, arch expanders, palatal expanders, twin blocks, occlusal blocks, bite ramps, mandibular advancement splints, bite plates, pontics, hooks, brackets, headgear tubes, springs, bumper tubes, palatal bars, frameworks, pin-and-tube apparatuses, buccal shields, buccinator bows, wire shields, lingual flanges and pads, lip pads or bumpers, protrusions, divots, and the like. In some embodiments, the appliances, systems and methods described herein include improved orthodontic appliances with integrally formed features that are shaped to couple to such auxiliary components, or that replace such auxiliary components.

Figure 1B:
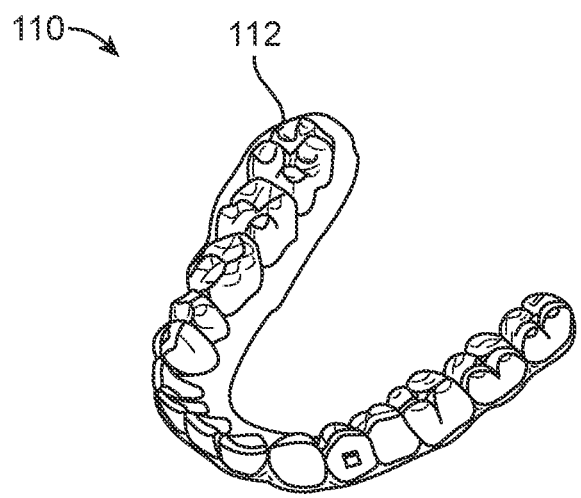
FIG. 1B illustrates a tooth repositioning system, in accordance with one or more embodiments herein.
Figure 1B:
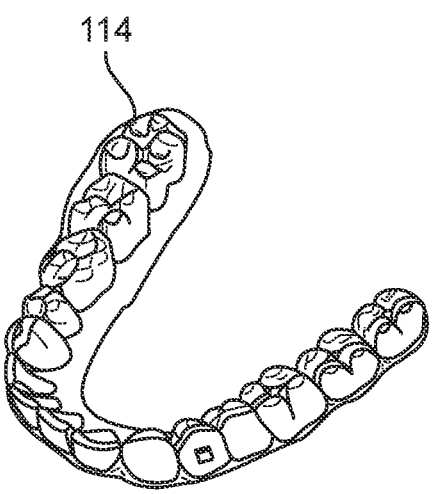
Figure 1B:
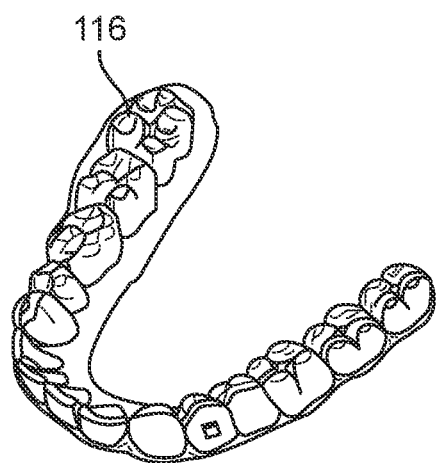

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement towards a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, remodeling or reformation of the jaw, and the like), etc. As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
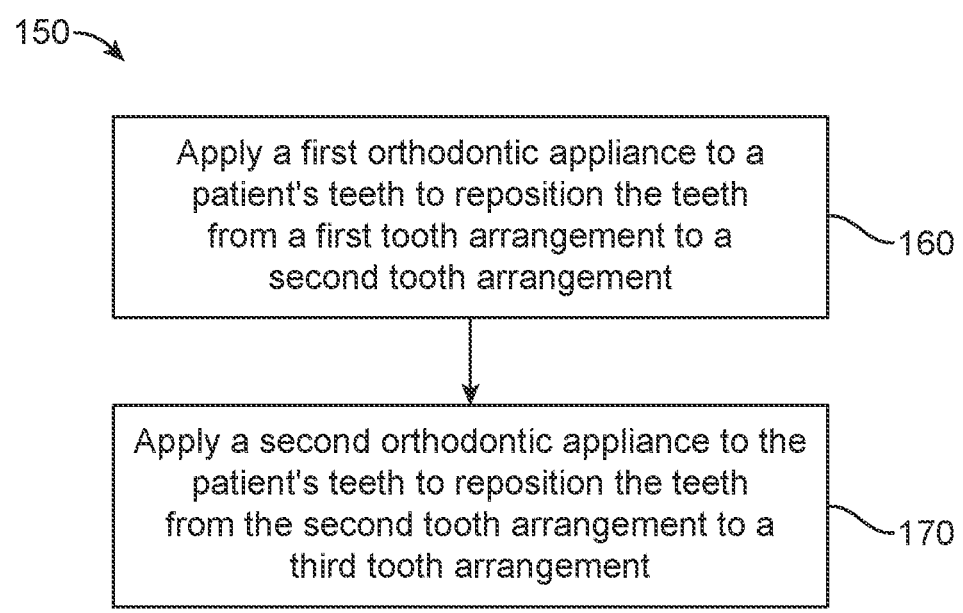
FIG. 1C illustrates a method of orthodontic treatment using a plurality of appliances, in accordance with one or more embodiments herein.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The various embodiments of the orthodontic appliances presented herein can be fabricated in a wide variety of ways. In some embodiments, the orthodontic appliances herein (or portions thereof) can be produced using direct fabrication, such as additive manufacturing techniques (also referred to herein as "3D printing) or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can be categorized as follows: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photopolymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

In some embodiments, the direct fabrication methods provided herein build up the object geometry in a layer-by-layer fashion, with successive layers being formed in discrete build steps. Alternatively or in combination, direct fabrication methods that allow for continuous build-up of an object's geometry can be used, referred to herein as "continuous direct fabrication." Various types of continuous direct fabrication methods can be used. As an example, in some embodiments, the appliances herein are fabricated using "continuous liquid interphase printing," in which an object is continuously built up from a reservoir of photopolymerizable resin by forming a gradient of partially cured resin between the building surface of the object and a polymerization-inhibited "dead zone." In some embodiments, a semi-permeable membrane is used to control transport of a photopolymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photopolymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: polymer matrix reinforced with ceramic or metallic polymers, a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, or combinations thereof. The materials used for direct fabrication can be provided in an uncured form (e.g., as a liquid, resin, powder, etc.) and can be cured (e.g., by photopolymerization, light curing, gas curing, laser curing, crosslinking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step using the same fabrication machine and method. For instance, a multi-tip extrusion apparatus can be used to selectively dispense multiple types of materials (e.g., resins, liquids, solids, or combinations thereof) from distinct material supply sources in order to fabricate an object from a plurality of different materials. Such methods are described in U.S. Pat. No. 6,749,414, the disclosure of which is incorporated herein by reference in its entirety. Alternatively or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed. The relative arrangement of the first and second portions can be varied as desired, e.g., the first portion can be partially or wholly encapsulated by the second portion of the object. The sequential manufacturing steps can be performed using the same fabrication machine or different fabrication machines, and can be performed using the same fabrication method or different fabrication methods. For example, a sequential multi-manufacturing procedure can involve forming a first portion of the object using stereolithography and a second portion of the object using fused deposition modeling.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 µm, or within a range from about 5 µm to about 50 µm, or within a range from about 20 µm to about 50 µm.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every $n^{th}$ build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variable in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

Although various embodiments herein are described with respect to direct fabrication techniques, it shall be appreciated that other techniques can also be used, such as indirect fabrication techniques. In some embodiments, the appliances herein (or portions thereof) can be produced using indirect fabrication techniques, such as by thermoforming over a positive or negative mold. Indirect fabrication of an orthodontic appliance can involve one or more of the following steps: producing a positive or negative mold of the patient's dentition in a target arrangement (e.g., by additive manufacturing, milling, etc.), thermoforming one or more sheets of material over the mold in order to generate an appliance shell, forming one or more structures in the shell (e.g., by cutting, etching, etc.), and/or coupling one or more components to the shell (e.g., by extrusion, additive manufacturing, spraying, thermoforming, adhesives, bonding, fasteners, etc.). Optionally, one or more auxiliary appliance components as described herein (e.g., elastics, wires, springs, bars, arch expanders, palatal expanders, twin blocks, occlusal blocks, bite ramps, mandibular advancement splints, bite plates, pontics, hooks, brackets, headgear tubes, bumper tubes, palatal bars, frameworks, pin-and-tube apparatuses, buccal shields, buccinator bows, wire shields, lingual flanges and pads, lip pads or bumpers, protrusions, divots, etc.) are formed separately from and coupled to the appliance shell (e.g., via adhesives, bonding, fasteners, mounting features, etc.) after the shell has been fabricated.

In some embodiments, the orthodontic appliances herein can be fabricated using a combination of direct and indirect fabrication techniques, such that different portions of an appliance can be fabricated using different fabrication techniques and assembled in order to form the final appliance. For example, an appliance shell can be formed by indirect fabrication (e.g., thermoforming), and one or more structures or components as described herein (e.g., auxiliary components, power arms, etc.) can be added to the shell by direct fabrication (e.g., printing onto the shell).

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled additive manufacturing such as 3D printing, etc.). The computer-based methods presented herein can improve the accuracy, flexibility, and convenience of appliance fabrication.

In some embodiments, computer-based 3-dimensional planning/design tools, such as Treat™ software from Align Technology, Inc., may be used to design and fabricate the orthodontic appliances described herein.

Figure 2:
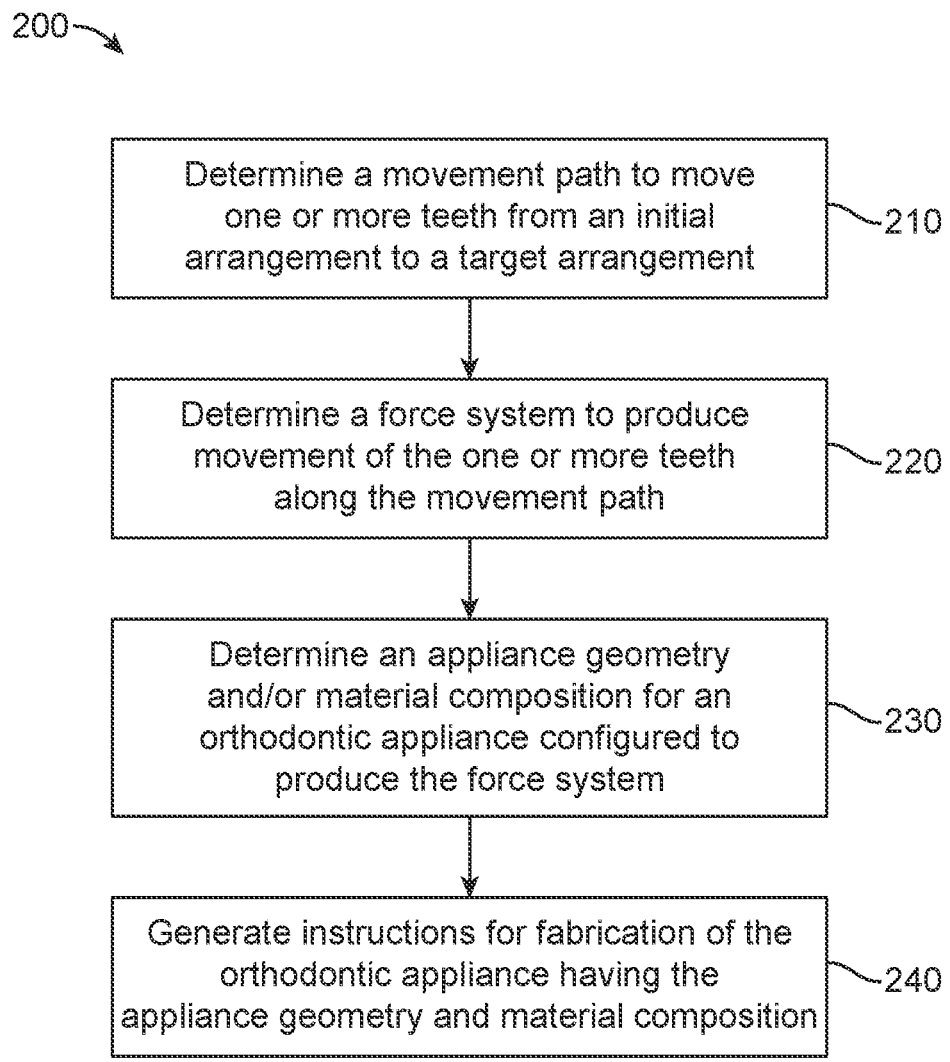
FIG. 2 illustrates a method for designing an orthodontic appliance, in accordance with one or more embodiments herein.

FIG. 2 illustrates a method 200 for designing an orthodontic appliance to be fabricated, in accordance with embodiments. The method 200 can be applied to any embodiment of the orthodontic appliances described herein. Some or all of the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping or the most optimal fashion to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 220, a force system to produce movement of the one or more teeth along the movement path is determined. A force system can include one or more forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

Determination of the force system can be performed in a variety of ways. For example, in some embodiments, the force system is determined on a patient-by-patient basis, e.g., using patient-specific data. Alternatively or in combination, the force system can be determined based on a generalized model of tooth movement (e.g., based on experimentation, modeling, clinical data, etc.), such that patient-specific data is not necessarily used. In some embodiments, determination of a force system involves calculating specific force values to be applied to one or more teeth to produce a particular movement. Alternatively, determination of a force system can be performed at a high level without calculating specific force values for the teeth. For instance, step 220 can involve determining a particular type of force to be applied (e.g., extrusive force, intrusive force, translational force, rotational force, tipping force, torqueing force, etc.) without calculating the specific magnitude and/or direction of the force.

In step 230, an appliance geometry and/or material composition for an orthodontic appliance configured to produce the force system is determined. The appliance can be any embodiment of the appliances discussed herein, such as an appliance having variable localized properties, integrally formed components, and/or power arms.

For example, in some embodiments, the appliance comprises a heterogeneous thickness, a heterogeneous stiffness, or a heterogeneous material composition. In some embodiments, the appliance comprises two or more of a heterogeneous thickness, a heterogeneous stiffness, or a heterogeneous material composition. In some embodiments, the appliance comprises a heterogeneous thickness, a heterogeneous stiffness, and a heterogeneous material composition. The heterogeneous thickness, stiffness, and/or material composition can be configured to produce the force system for moving the teeth, e.g., by preferentially applying forces at certain locations on the teeth. For example, an appliance with heterogeneous thickness can include thicker portions that apply more force on the teeth than thinner portions. As another example, an appliance with heterogeneous stiffness can include stiffer portions that apply more force on the teeth than more elastic portions. Variations in stiffness can be achieved by varying the appliance thickness, material composition, and/or degree of photopolymerization, as described herein.

In some embodiments, determining the appliance geometry and/or material composition comprises determining the geometry and/or material composition of one or more integrally formed components to be directly fabricated with an appliance shell. The integrally formed component can be any of the embodiments described herein. The geometry and/or material composition of the integrally formed component(s) can be selected to facilitate application of the force system onto the patient's teeth. The material composition of the integrally formed component can be the same as or different from the material composition of the shell.

In some embodiments, determining the appliance geometry also comprises determining the shape and position of class III correction structures and features of a class III corrective appliance, such as, for example, elastic coupling locations.

The step 230 can involve analyzing the desired force system in order to determine an appliance geometry and material composition that would produce the force system. In some embodiments, the analysis involves determining appliance properties (e.g., stiffness) at one or more locations that would produce a desired force at the one or more locations. The analysis can then involve determining an appliance geometry and material composition at the one or more locations to achieve the specified properties. Determination of the appliance geometry and material composition can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the Auto-CAD® software products available from Autodesk, Inc., of San Rafael, Calif. For creating finite element models and analyzing them, program products from a number of vendors can be used, including finite element analysis packages from ANSYS, Inc., of Canonsburg, Pa., and SIMULIA (Abaqus) software products from Dassault Systèmes of Waltham, Mass.

Optionally, one or more appliance geometries and material compositions can be selected for testing or force modeling. As noted above, a desired tooth movement, as well as a force system required or desired for eliciting the desired tooth movement, can be identified. Using the simulation environment, a candidate appliance geometry and composition can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

Optionally, step 230 can further involve determining the geometry of one or more auxiliary components to be used in combination with the orthodontic appliance in order to exert the force system on the one or more teeth. Such auxiliaries can include one or more of tooth-mounted attachments, elastics, wires, springs, bite blocks, arch expanders, wire-and-bracket appliances, shell appliances, headgear, or any other orthodontic device or system that can be used in conjunction with the orthodontic appliances herein. The use of such auxiliary components may be advantageous in situations where it is difficult for the appliance alone to produce the force system. Additionally, auxiliary components can be added to the orthodontic appliance in order to provide other desired functionalities besides producing the force system, such as mandibular advancement splints to treat sleep apnea, pontics to improve aesthetic appearance, and so on. In some embodiments, the auxiliary components are fabricated and provided separately from the orthodontic appliance. Alternatively, the geometry of the orthodontic appliance can be modified to include one or more auxiliary components as integrally formed components.

Optionally, step 230 can further involve determining the geometry of one or more auxiliary components or appliances to be used in combination with the orthodontic appliance in order to exert the force system on a patient's maxilla. Such components or appliances can include one or more of class III correction appliances and features, such as described herein with respect to FIGS. 6-9, as well as features described above, such as tooth-mounted attachments, elastics, wires, springs, bite blocks, arch expanders, wire-and-bracket appliances, shell appliances, headgear, or any other orthodontic device or system that can be used in conjunction with the orthodontic appliances herein. The use of such auxiliary components or appliances may be advantageous in situations where it is difficult for the appliance alone to produce the force system. Additionally, auxiliary components can be added to the orthodontic appliance in order to provide other desired functionalities besides producing the force system. In some embodiments, the auxiliary components are fabricated and provided separately from the orthodontic appliance. Alternatively, the geometry of the orthodontic appliance can be modified to include one or more auxiliary components or appliances as integrally formed components.

In step 240, instructions for fabrication of the orthodontic appliance having the appliance geometry and material composition are generated. The instructions can be configured to control a fabrication system or device in order to produce the orthodontic appliance with the specified appliance geometry and material composition. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.). Optionally, the instructions can be configured to cause a fabrication machine to directly fabricate the orthodontic appliance with teeth receiving cavities having variable gable bends, as discussed above and herein. In alternative embodiments, the instructions can be configured for indirect fabrication of the appliance, e.g., by thermoforming.

Although the above steps show a method 200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired. For instance, in some embodiments, step 220 is optional, such that step 230 involves determining the appliance geometry and/or material composition based directly on the tooth movement path rather than based on the force system.

Figure 3:
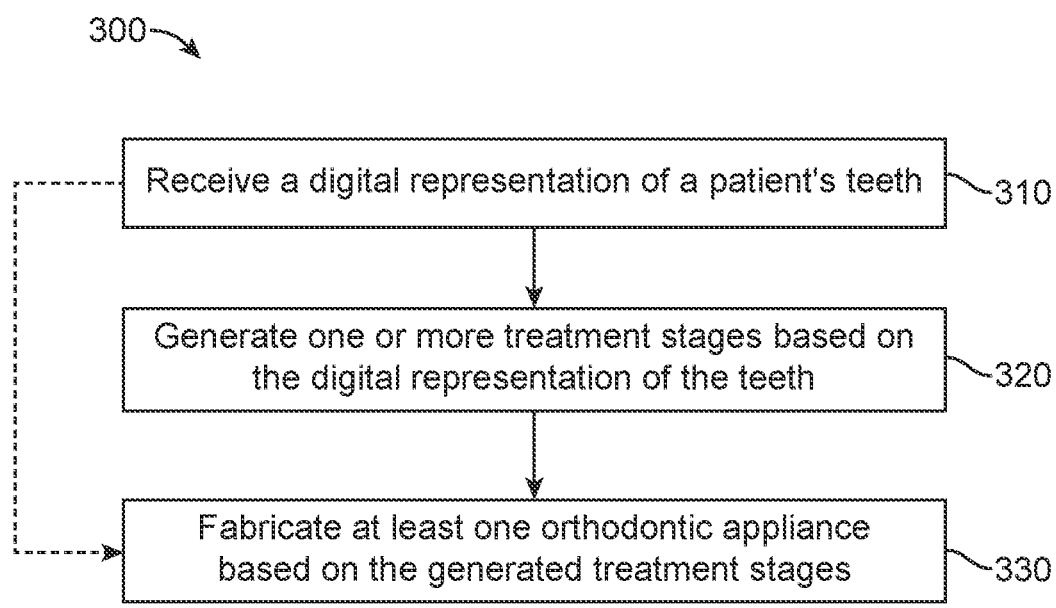
FIG. 3 illustrates a method for digitally planning an orthodontic treatment, in accordance with one or more embodiments herein.

FIG. 3 illustrates a method 300 for digitally planning an orthodontic treatment and/or design or fabrication of an appliance, in accordance with embodiments. The method 300 can be applied to any of the treatment procedures described herein and can be performed by any suitable data processing system.

In step 310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 320, one or more treatment stages are generated based on the digital representation of the teeth. The treatment stages can be incremental repositioning stages of an orthodontic treatment procedure designed to move one or more of the patient's teeth or arch, such as the maxilla, from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 330, at least one orthodontic appliance is fabricated based on the generated treatment stages. For example, a set of appliances can be fabricated, each shaped according to a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth 310), followed by design and/or fabrication of an orthodontic appliance based on a representation of the patient's teeth in the arrangement represented by the received representation.

Optionally, some or all of the steps of the method 300 are performed locally at the site where the patient is being treated and during a single patient visit, referred to herein as "chair side manufacturing." Chair side manufacturing can involve, for example, scanning the patient's teeth, automatically generating a treatment plan with treatment stages, and immediately fabricating one or more orthodontic appliance(s) to treat the patient using a chair side direct fabrication machine, all at the treating professional's office during a single appointment. In embodiments where a series of appliances are used to treat the patient, the first appliance may be produced chair side for immediate delivery to the patient, with the remaining appliances produced separately (e.g., off site at a lab or central manufacturing facility) and delivered at a later time (e.g., at a follow up appointment, mailed to the patient). Alternatively, the methods herein can accommodate production and immediate delivery of the entire series of appliances on site during a single visit. Chair side manufacturing can thus improve the convenience and speed of the treatment procedure by allowing the patient to immediately begin treatment at the practitioner's office, rather than having to wait for fabrication and delivery of the appliances at a later date. Additionally, chair side manufacturing can provide improved flexibility and efficiency of orthodontic treatment. For instance, in some embodiments, the patient is re-scanned at each appointment to determine the actual positions of the teeth, and the treatment plan is updated accordingly. Subsequently, new appliances can be immediately produced and delivered chair side to accommodate any changes to or deviations from the treatment plan.

Figure 4:
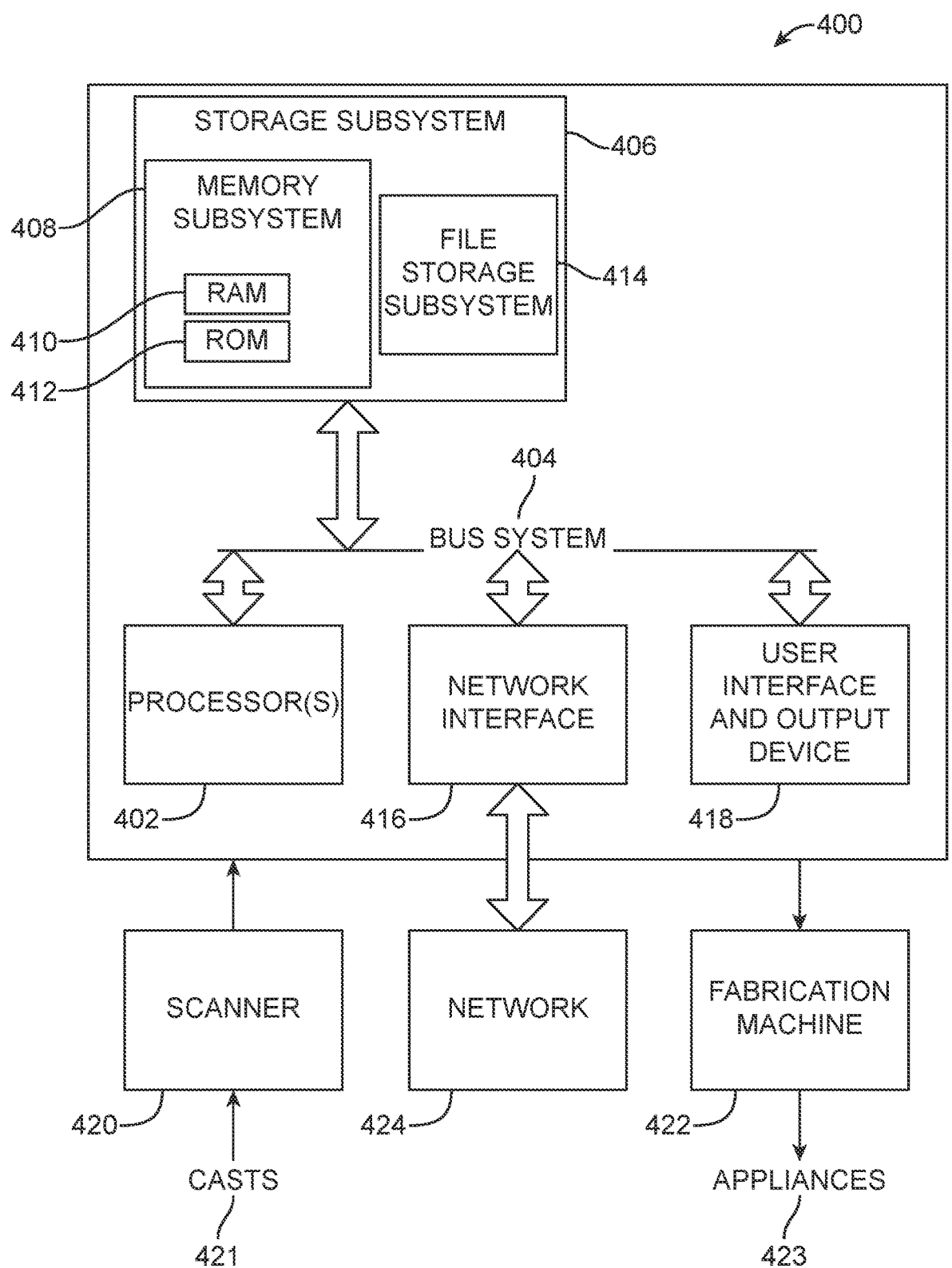
FIG. 4 is a simplified block diagram of a data processing system, in accordance with one or more embodiments herein.

FIG. 4 is a simplified block diagram of a data processing system 400 that may be used in executing methods and processes described herein. The data processing system 400 typically includes at least one processor 402 that communicates with one or more peripheral devices via bus subsystem 404. These peripheral devices typically include a storage subsystem 406 (memory subsystem 408 and file storage subsystem 414), a set of user interface input and output devices 418, and an interface to outside networks 416. This interface is shown schematically as "Network Interface" block 416, and is coupled to corresponding interface devices in other data processing systems via communication network interface 424. Data processing system 400 can include, for example, one or more computers, such as a personal computer, workstation, mainframe, laptop, and the like.

The user interface input devices 418 are not limited to any particular device, and can typically include, for example, a keyboard, pointing device, mouse, scanner, interactive displays, touchpad, joysticks, etc. Similarly, various user interface output devices can be employed in a system of the invention, and can include, for example, one or more of a printer, display (e.g., visual, non-visual) system/subsystem, controller, projection device, audio output, and the like.

Storage subsystem 406 maintains the basic required programming, including computer readable media having instructions (e.g., operating instructions, etc.), and data constructs. The program modules discussed herein are typically stored in storage subsystem 406. Storage subsystem 406 typically includes memory subsystem 408 and file storage subsystem 414. Memory subsystem 408 typically includes a number of memories (e.g., RAM 410, ROM 412, etc.) including computer readable memory for storage of fixed instructions, instructions and data during program execution, basic input/output system, etc. File storage subsystem 414 provides persistent (non-volatile) storage for program and data files, and can include one or more removable or fixed drives or media, hard disk, floppy disk, CD-ROM, DVD, optical drives, and the like. One or more of the storage systems, drives, etc., may be located at a remote location, such coupled via a server on a network or via the internet/World Wide Web. In this context, the term "bus subsystem" is used generically so as to include any mechanism for letting the various components and subsystems communicate with each other as intended and can include a variety of suitable components/systems that would be known or recognized as suitable for use therein. It will be recognized that various components of the system can be, but need not necessarily be at the same physical location, but could be connected via various local-area or wide-area network media, transmission systems, etc.

Scanner 420 includes any means for obtaining a digital representation (e.g., images, surface topography data, etc.) of a patient's teeth (e.g., by scanning physical models of the teeth such as casts 421, by scanning impressions taken of the teeth, or by directly scanning the intraoral cavity), which can be obtained either from the patient or from treating professional, such as an orthodontist, and includes means of providing the digital representation to data processing system 400 for further processing. Scanner 420 may be located at a location remote with respect to other components of the system and can communicate image data and/or information to data processing system 400, for example, via a network interface 424. Fabrication system 422 fabricates appliances 423 based on a treatment plan, including data set information received from data processing system 400. Fabrication machine 422 can, for example, be located at a remote location and receive data set information from data processing system 400 via network interface 424.

The data processing aspects of the methods described herein can be implemented in digital electronic circuitry, or in computer hardware, firmware, software, or suitable combinations thereof. Data processing apparatus can be implemented in a computer program product tangibly embodied in a machine-readable storage device for execution by a programmable processor. Data processing steps can be performed by a programmable processor executing program instructions to perform functions by operating on input data and generating output. The data processing aspects can be implemented in one or more computer programs that are executable on a programmable system, the system including one or more programmable processors operably coupled to a data storage system. Generally, a processor will receive instructions and data from a read-only memory and/or a random access memory. Storage devices suitable for tangibly embodying computer program instructions and data include all forms of nonvolatile memory, such as: semiconductor memory devices, such as EPROM, EEPROM, and flash memory devices; magnetic disks such as internal hard disks and removable disks; magneto-optical disks; and CD-ROM disks.

Figure 5:
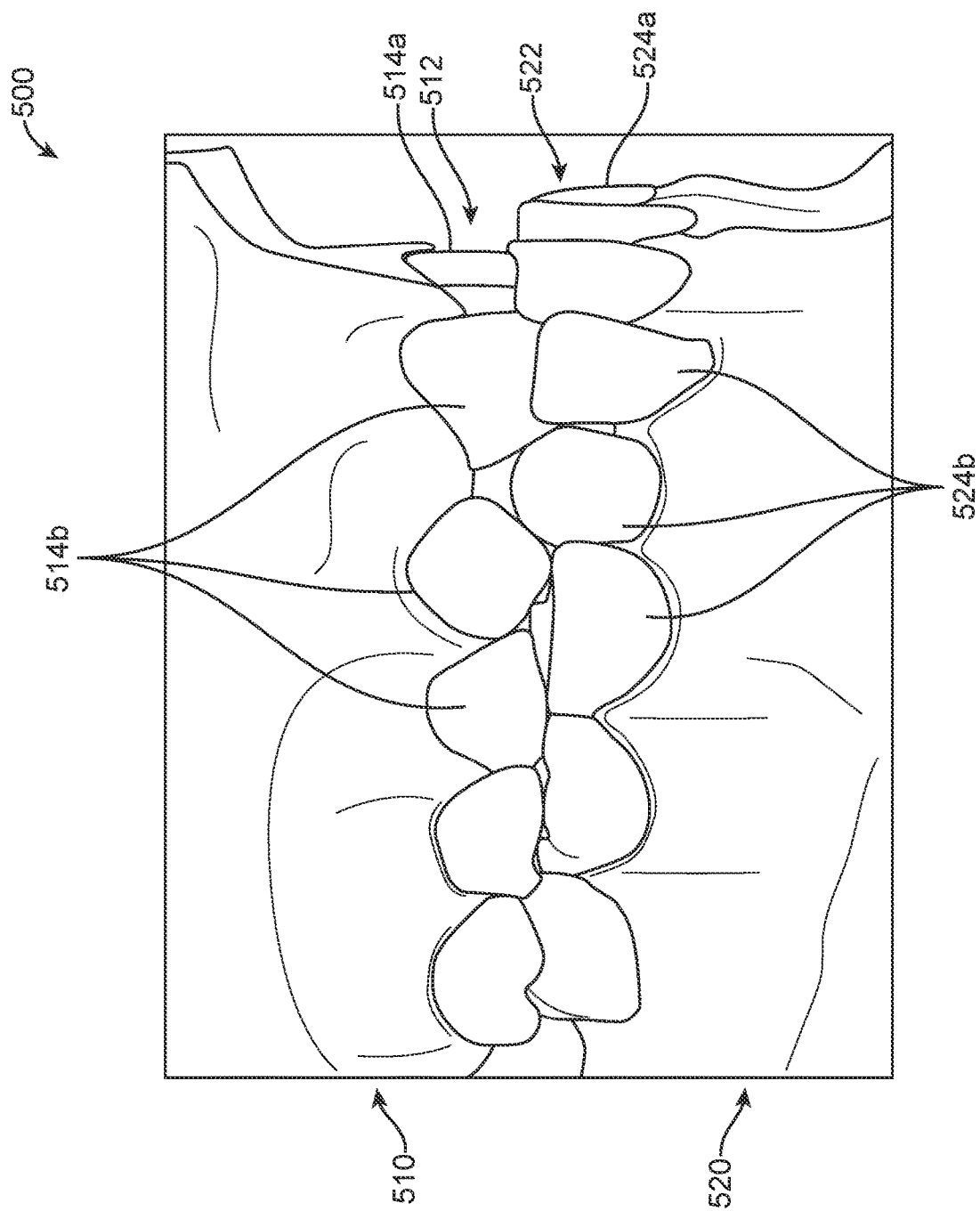
FIG. 5 depicts an embodiment of a class III malocclusion of a patient's teeth.

FIG. 5 depicts class III malocclusion of a patient. The jaw 500 of a patient includes an upper jaw 510, sometimes called the maxillary jaw, which includes the upper or maxillary arch 512 of upper teeth 514. The jaw 500 also includes the lower jaw 520, sometimes called the mandibular jaw, which includes the lower or mandibular arch 522 of lower teeth 524.

In a class III malocclusion, the maxillary anterior teeth 514a of the maxillary arch 512 rests posterior to the mandibular anterior teeth 524a of the mandibular arch 522. Class II malocclusions may also cause posterior teeth 514b, 524b of the respective arches 512, 514 to have in a cross bite malocclusion, such that the buccal cusp tips of posterior teeth of the upper arch 512 rest inside the fossae of the lower teeth of the lower arch 522, instead of the cusp tips of the lower arch teeth resting inside the fossae of the teeth of the upper arch. Class III malocclusion causes an improper bite relationship between the teeth of the upper arch and the teeth of the lower arch. Class III and cross bite malocclusions may result in difficulty chewing and facial aesthetics that some people find undesirable. The systems described herein correct these and other malocclusions.

Referring now to FIGS. 6a, 6b, and 6c an appliance system 600 for correcting malocclusions of a patient is shown as installed on a patient. The appliance system 600 may include multiple individual appliances. For example, as shown in FIGS. 6a, 6b, and 6c, the appliance system 600 includes three appliances. In particular, the system 600 includes an upper tooth repositioning appliance 610, a lower tooth repositioning appliance 630, and a class III corrective appliance 650. This combination of appliances allows for the repositioning of teeth in both the upper and lower arches using the repositioning appliance 610, 630 during the same stage or stages of treatment as the correction of the class III malocclusion occurs with the class III corrective appliance 650.

The upper appliance 610 and lower appliance 630 may be similar to the appliance 100 and appliances 112, 114, 116 described above with respect to FIGS. 1A and 1B. The upper and lower appliances 610, 630 may be tooth repositioning appliances that can be worn by a patient in order to achieve an incremental repositioning of individual teeth in the jaw. The appliance can include a shell having teeth-receiving cavities 614, 632 that receive and resiliently reposition the teeth. An appliance or portion(s) thereof may be indirectly fabricated using a physical model of teeth. For example, an appliance can be formed using a physical model of teeth and a sheet of suitable layers of polymeric material. In some embodiments, a physical appliance is directly fabricated, e.g., using additive manufacturing techniques, from a digital model of an appliance. An appliance can fit over all teeth present in an upper or lower jaw, or less than all of the teeth. The appliance can be designed specifically to accommodate the teeth of the patient, and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some or most, and even all, of the teeth will be repositioned at some point during treatment. Teeth that are moved can also serve as a base or anchor for holding the appliance as it is worn by the patient.

The appliance system 600 also includes a class III appliance 650 that aids in correcting class III malocclusions in patients. The appliance 650 includes two mounts 652, 654 connected to each other by a bridge 660 that extends between and separates the mounts 652, 654. The structure and features of the mounts 652, 654 are described herein with reference to the right mount 652, however the structure and features of the right mount 652 also apply to the left mount 654 and also to single mount systems, as described herein.

The class III appliance 650 may be a directly fabricated appliance which may be fabricated as discussed above.

Figure 7A:
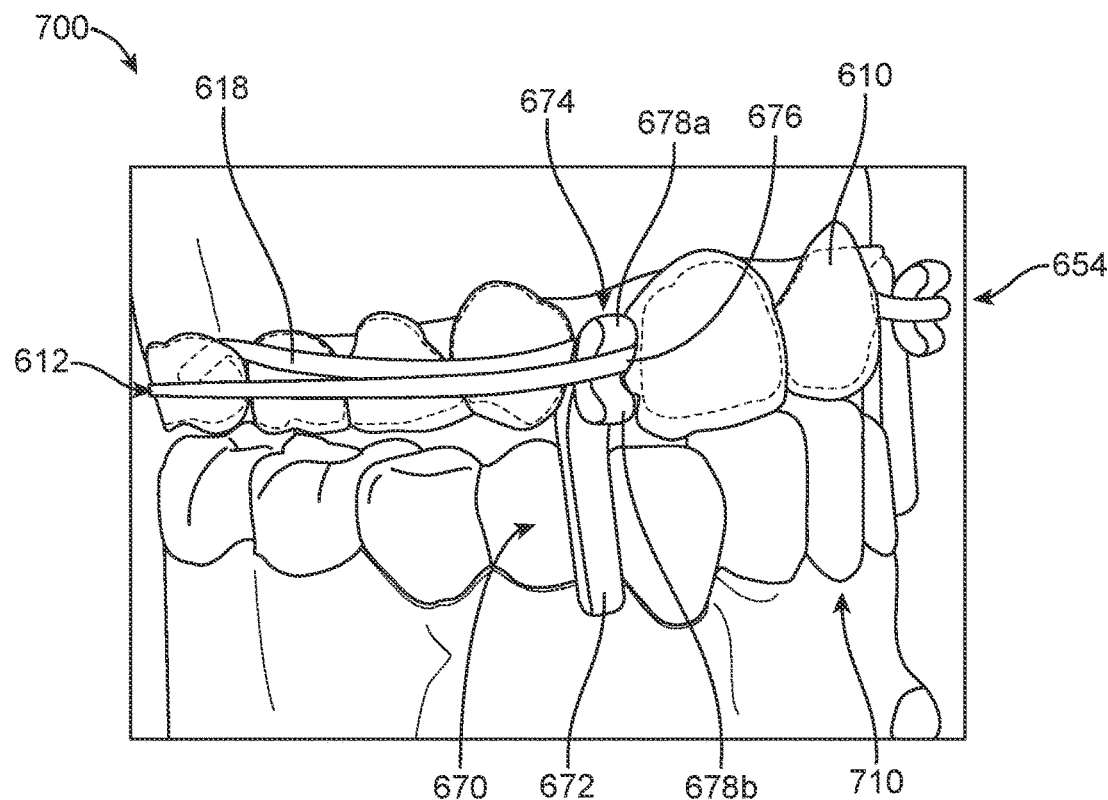
FIG. 7a depicts an appliance system for correcting class III malocclusions of a patient installed on a patient, in accordance with one or more embodiments herein.
Figure 7B:
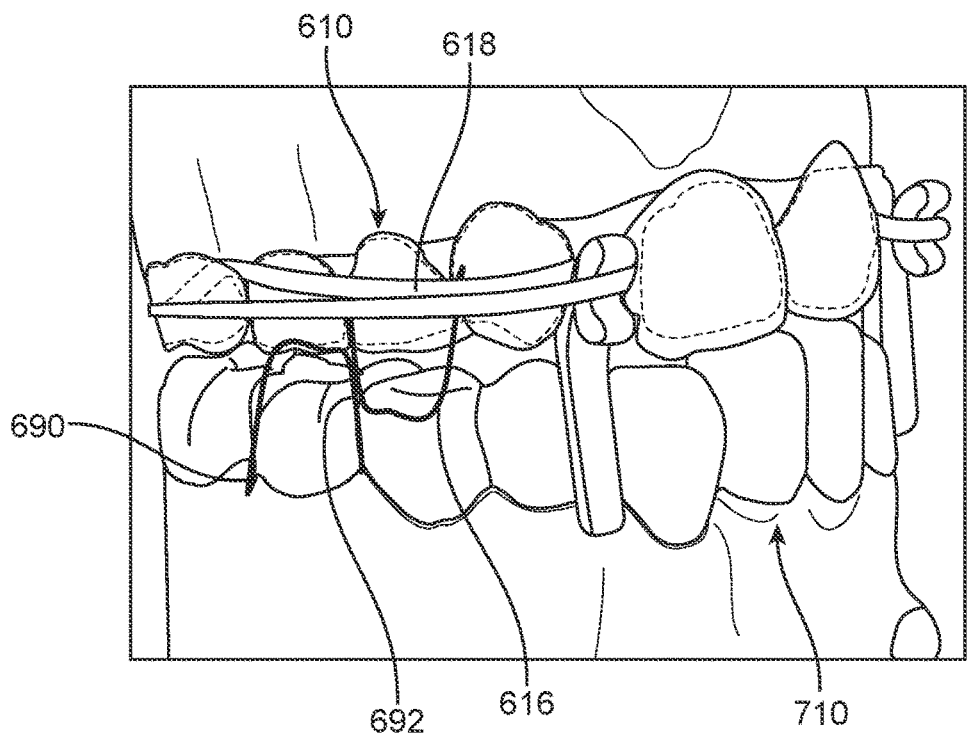
FIG. 7b depicts the appliance system of FIG. 7a with maxillary devices, in accordance with one or more embodiments herein.

The mount 652 includes a cavity 656 that couples the mount 652 to the appliance 650. In some embodiments, the cavity 656 may be a tooth receiving cavity that couples directly to the one or more teeth of the patient, for example, as shown in FIGS. 7a and 7b. In some embodiments, the cavity 656 receives the teeth indirectly, for example via the appliance 630. In such an embodiment, the cavity 656 may be shaped to receive and couple with the outer surface of the lower appliance 630. The cavity 656 releasably couples the class III appliance 650 to the tooth repositioning appliance 630.

Figure 6D:
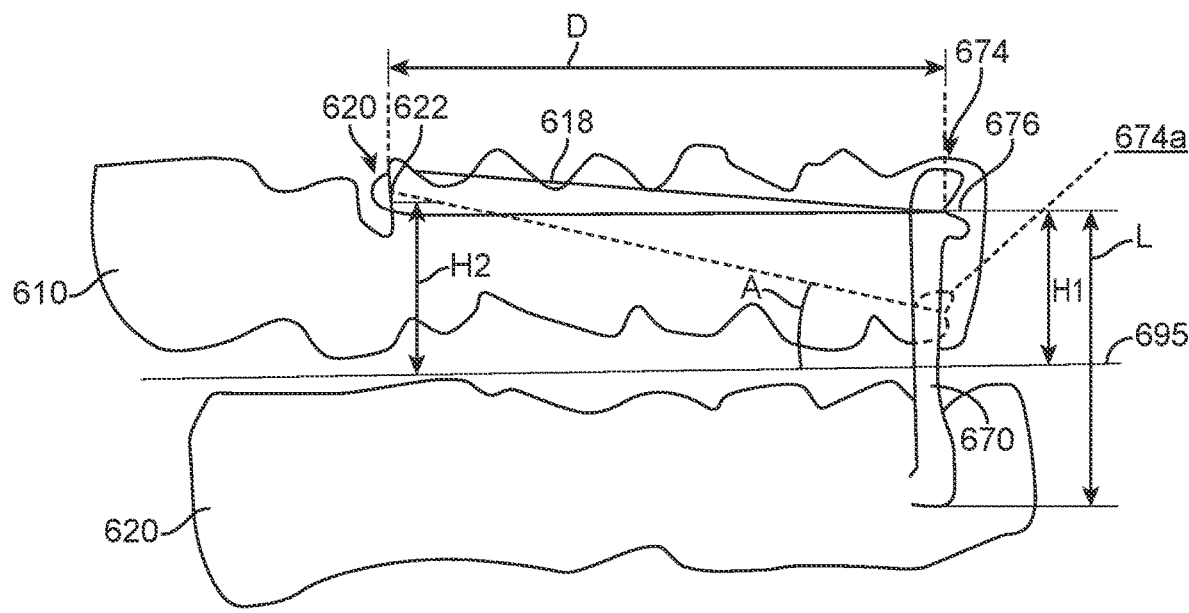
FIG. 6d depicts a side view of the appliance system of FIG. 6a, in accordance with one or more embodiments herein.
Figure 6E:
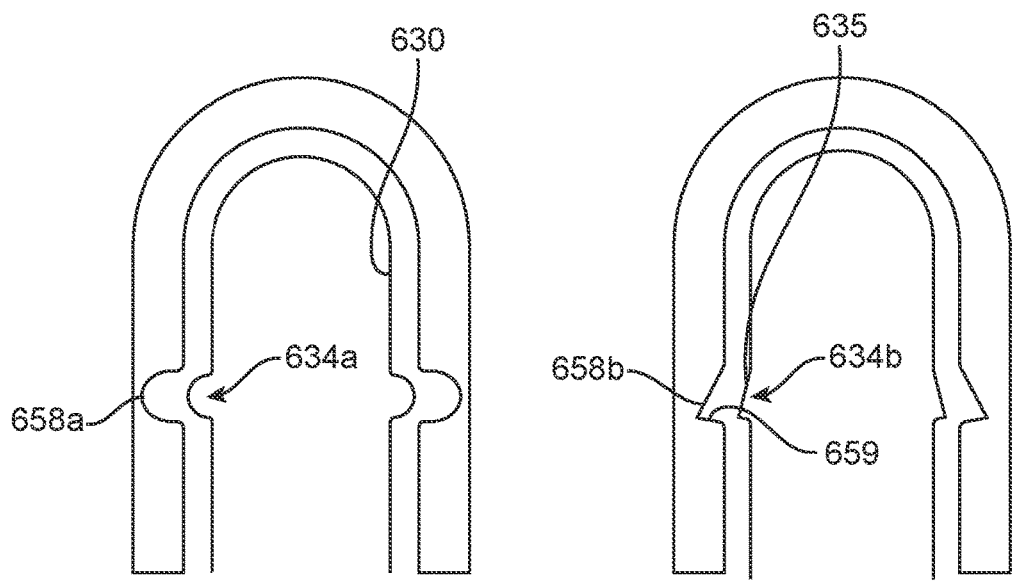
FIG. 6e depicts a cross-sectional view E-E of the appliance system of FIG. 6b, in accordance with one or more embodiments herein.

FIG. 6e shows embodiments of systems for releasably coupling the class III appliance 650 and the tooth repositioning appliance 630. The tooth repositioning appliance 630 may include one or more protrusions 634 on one or both of the outer buccal and lingual surfaces of the appliance 630. The protrusion may engage with one or more respective receptacles or cavities 658 in the inner or tooth facing surface to couple the class III appliance 650 with the tooth repositioning appliance 630.

The cavities 658 may have a shape and size that mates with the shape and size of the corresponding protrusions 634. For example, cavity 658a has a semicircular cross-sectional shape that mates with the semicircular cross-sectional shape of the protrusion 634a. As shown in the right hand side of FIG. 6e, the receptacle 658b and cavity 634b may include respective engagement surfaces 659, 635 that are shaped to resist removal of the class III appliance from the repositioning appliance 630, while permitting intentional removal of the appliance.

Each mount 652 may also include an arm or extension 670 with a coupling 674 at a terminal end thereof. The arm 670 is coupled to the mount at a buccal surface of the class III appliance 650, for example at the mount 670. In some embodiments, the arm is integral to the mount and extends upwards beyond the occlusal surfaces of the class III appliance 650 and the tooth repositioning appliance 630. In some embodiments, the arm extends beyond the occlusal plane of the patent when the appliance 650 is installed on the patient. The arm 670 may include both an anchored portion 673, that is coupled or integral to the buccal surface of the appliance 650 and a cantilevered portion 675 that extends away from the appliance 650.

The coupling 674 may be located at the terminal or distal end of the arm 670. The coupling 674 may be shaped to receive an elastic or a portion of an elastic, such as the elastic 618. The terminal end of the arm 670 may also include a button coupling, be custom shaped based on the treatment plan, may be flat or otherwise shaped to receive any other auxiliary, as determined in the treatment plan or by a doctor. The coupling 674 includes finger extension 678 on either side of a receptacle 676. The finger extensions 678 in combination with the receptacle 676 aid in positing an end of the elastic 618 at a particular location in space relative to the patient's jaw or relative to one or more of the appliances 610, 630, 650.

A second portion or end of the elastic 618 may be engaged with or otherwise coupled to the upper appliance 610 via the coupling 620. As shown in more detail in FIG. 6d, the coupling 620 may extend from a gingival surface of a buccal wall of the appliance 610 towards the occlusal surface of the appliance 610. The coupling 620 may be a slit formed by a cut in the buccal wall of the appliance 610. In some embodiments, the coupling 620 may be an orthodontic button that may be bonded directly to the tooth. In such an embodiment, the aligner may have a cut out to accommodate the button. In some embodiments, the coupling 620 may be formed via a material removal operation wherein a portion of the wall of the appliance 610 is removed. In some embodiments, the coupling 620 may include a recess 622 on an anterior edge of the coupling. The recess 622 may be located at a particular location relative to the location of the receptacle 676 of the coupling 674 in order to receive the elastic in a particular location and apply a particular force vector to the upper arch.

By adding the coupling 620 to the upper appliance, the arch repositioning force that is applied by the elastic to the upper appliance 610 may be distributed to the entire arch of teeth. This allows the teeth to move together, as a unit. The force applied to the teeth also elicits a biological response in the upper arch and maxilla, encouraging growth of the maxilla. As the repositioning force is applied to the arch, the maxilla undergoes reformation and remodeling of the arch can correct class III malocclusions, even severe class III malocclusions that cannot be treated with tooth repositioning alone, so called camouflage treatments.

In some embodiments, the maxillary arch may be moved in multiple directions. For example, the maxillary arch may be encouraged to grow in a direction parallel to the occlusal plane. In such an embodiment, the angle A, between the coupling 620 on the appliance 610 and the coupling 674 of the class III appliance 650 with respect to the occlusal plane 695 may be 0 degrees, such that the elastic is parallel or substantially parallel to the occlusal plane. In some embodiments, the maxillary arch may be encouraged to grow in an anterior direction and in an occlusal direction, towards the mandibular arch.

The length and position of the arms 674 and attached receptacle 676 and the position of the coupling 620 can be selected to elicit particular forces on the upper arch. As shown in FIG. 6d, the arm 674 may have a length L between the receptacle 676 at one end and the arm's attachment to the mount 670. The receptacle 676 may also extend a height H1 above the occlusal plane, which may be determined, at least in part by the length L of the arm. In addition, the coupling 620 may be a height H2 from the occlusal plane. The distance D is the distance between the coupling 620 on the appliance 610 of the upper arch and the coupling 674 of the appliance 650.

The relative heights H1, H2, angle A, and the distance D may be varied and controlled to elicit a particular force system on the upper arch. For example, as shown by dashed lines in FIG. 6d, the coupling 674 can be moved to a lower position 674a such that the angle A increases. The increased angle with respect to the occlusal plane causes the elastic to apply a force in a downward (towards the occlusal plane) and anterior direction. This force may cause the arch of teeth to move forward and downward. Such a forward and downward movement may reduce a class III occlusion and also reduce open bite in a patient, thereby treating two different malocclusions at the same time.

In addition, the anterior-posterior position of one or both of the coupling 620 and the coupling 674 maybe moved to increase or decrease the distance D between the coupling 620, 674. For example, while the arm 670 and associate coupling 674 are shown as being coupled at or near the canine teeth, the arm may be positioned in other locations, for example, at or near the incisors, lateral incisors, cupids, bicuspids, or molars. Similarly, the coupling 620 is shown at the second molar, however, the coupling 620 may be positioned at or near the first molar, or the bicuspids.

One advantage of the systems described herein is that the arm remains in the oral cavity and does not extend outside the cavity. This aids concealing the appliance from view during everyday use which may lead to increased use (compliance) by patients as compared to external appliances that can be seen by others.

Referring now to FIG. 7a which depicts an appliance system for correcting malocclusions of a patient installed on a patient. Similar features are given the same reference numbers as shown and discussed above with respect to FIGS. 6a-6e. As shown in FIG. 7a, the appliance system 700 may include two appliances, an upper appliance 610 made from thermoformed polymer sheet and have features substantially as described with respect to FIGS. 6a-6e, however the directly fabricated class III appliance 710 includes a plurality of teeth receiving cavities to directly receive and reposition the teeth of the patient, obviating the use of a separate thermoformed appliance to reposition the teeth of the lower arch. This combination of appliances allows for the repositioning of teeth in both the upper and lower arches during the same stage or stages of treatment as the correction of the class III malocclusion occurs.

The class III appliance 710 may include one or more arms or extension 670 having a coupling 674 at a terminal end thereof. The arm 670 extends from a buccal surface of the class III appliance 710, for example at the outward facing external surface of the canine tooth receiving cavity. The arm 670 extends upwards beyond the occlusal surfaces of the appliance 710. In some embodiments, the arm extends beyond the occlusal plane of the patent when the appliance 710 is installed on the patient. The arm 670 may include both an anchored portion 673, that is coupled or integral to the buccal surface of the appliance 650 and a cantilevered portion 675 that extends away from the appliance 650.

The coupling 674 may be located at the terminal or distal end of the arm 670. The coupling 674 may be shaped to receive an elastic or a portion of an elastic, such as the elastic 618. The coupling 674 includes finger extension 678 on either side of a receptacle 676. The finger extensions 678 in combination with the receptacle 676 aid in positing an end of the elastic 618 at a particular location in space relative to the patient's jaw or relative to one or more of the appliances 610, 710, for example, as discussed above with respect to FIG. 6d.

FIG. 7b depicts the appliance system of FIG. 7a with class III correction protrusions 690, 616 that advance the teeth of the upper arch. Such protrusions 690, 616 may be referred to as maxillary devices or maxillary growth modification devices. Maxillary devices may restrict the growth of the mandible while applying forces on the maxilla in the forward direction to help redirect its growth.

The upper appliance 610 may include the upper maxillary device 616 and the lower appliance 710 may include the lower maxillary device 690. The maxillary devices 616, 690 can be positioned in different locations about the arch. For example, the upper maxillary device 616 and the lower maxillary device 690 may be positioned near occlusal surfaces of the teeth of the patient to advance the placement of the maxilla in a forward direction such as in an anterior direction toward a patient's lips. As an example, the upper maxillary device 616 may include a first surface 618 and the lower maxillary device 690 may include a second surface 962 to interface, interact, and/or otherwise engage with the first surface 618 of the upper maxillary device 616. The forces imparted on the maxilla by the interaction of the upper maxillary device 616 with the lower maxillary device 690 may cause remolding of the upper maxilla and anterior advancement of the upper arch with respect to the lower arch.

The upper maxillary device 616 may be positioned near occlusal, buccal, or lingual sides or walls of the upper appliance 610 and the lower maxillary device 690 may be positioned near occlusal, buccal, or lingual sides or walls of the lower appliance 710. Placement of the lower maxillary device 690 on the buccal sides or walls have the additional advantage of displacing the cheeks or lips of the patient away from the class III appliance 710, thereby reducing the forces applied by the cheeks to the upper arch of the patient.

Referring now to FIGS. 8a-8d an appliance system 800 for correcting malocclusions of a patient is shown. The system includes a lower appliance 810 and an upper appliance 802. The upper and lower appliances 802, 810 have respective maxilla repositioning devices 834, 812 thereon. The respective maxilla repositioning devices 834, 812 have similar features and functions as described above with respect to the upper and lower maxillary devices 616, 690 shown and described with respect to FIG. 7b. For example, the upper maxillary device 834 can include a first surface 836 and the lower maxillary device 812 can include a second surface 819 to interface, interact, and/or otherwise engage with the first surface 836 of the upper maxillary device 834. The forces imparted on the maxilla by the interaction of the upper maxillary device 834 with the lower maxillary device 812 may cause remolding of the upper maxilla and anterior of the upper arch with respect to the lower arch.

However, the upper appliance 802 also includes transpalatal features. As shown in FIG. 8d the appliance 802 may include a transpalatal extension 844 that extends between the tooth receiving cavities 842 on the left side of the arch and the tooth receiving cavities 842 on the right side of the arch. The transpalatal extension 844 may be shaped to conform to the posterior palate and include an anterior palate extension 846 that is shaped to match the surface of the anterior palate. The transpalatal extension 844 may perform two functions. First, the anterior extension 846 transmits at least a portion of the force imparted on the upper appliance 802 by the lower maxillary device 812 to the anterior palate. These forces may cause the anterior portion of the maxilla and the anterior teeth to move in an anterior direction, thereby aiding in the treatment of class III malocclusions.

While the transpalatal extension 844 is shown in FIG. 8d as covering the palate, in some embodiments, depending on the treatment plan and the corrections prescribed, less than the entire palate may be covered or engaged by the transpalatal device. Moreover, the transpalatal device 844 may include more or less tooth receiving cavities 842 than shown in FIG. 8d, depending on the treatment plan.

Second, the transpalatal extension 844 may be shaped such that when the appliance 802 is installed on a patient's arch, the extension 844 applies an outwardly directed force to the posterior teeth to cause the posterior portion of the arch to expand and correct cross-bite malocclusions which are common in patients that have class III malocclusions.

As also shown in FIGS. 8a-8d, the upper maxillary device 834 and the lower maxillary device 812 may each include stiffening structures. For example, as shown in FIGS. 8a and 8d, the upper maxillary device 834 includes lingual stiffening bars 840a, 840b on the lingual side of the upper maxillary device 834 and buccal stiffening bar 838 on the buccal side of the upper maxillary device 834.

As shown in FIGS. 8a and 8c, the lower maxillary device 812 includes lingual stiffening bars 814a, 814b on the lingual side of the upper maxillary device 834 and buccal stiffening bar 818 on the buccal side of the lower maxillary device 812.

The stiffening bars extend along the length of the respective devices and aid in increasing the stiffness of the cantilevered advance device which in turn reduces the bending of the devices.

Figure 9:
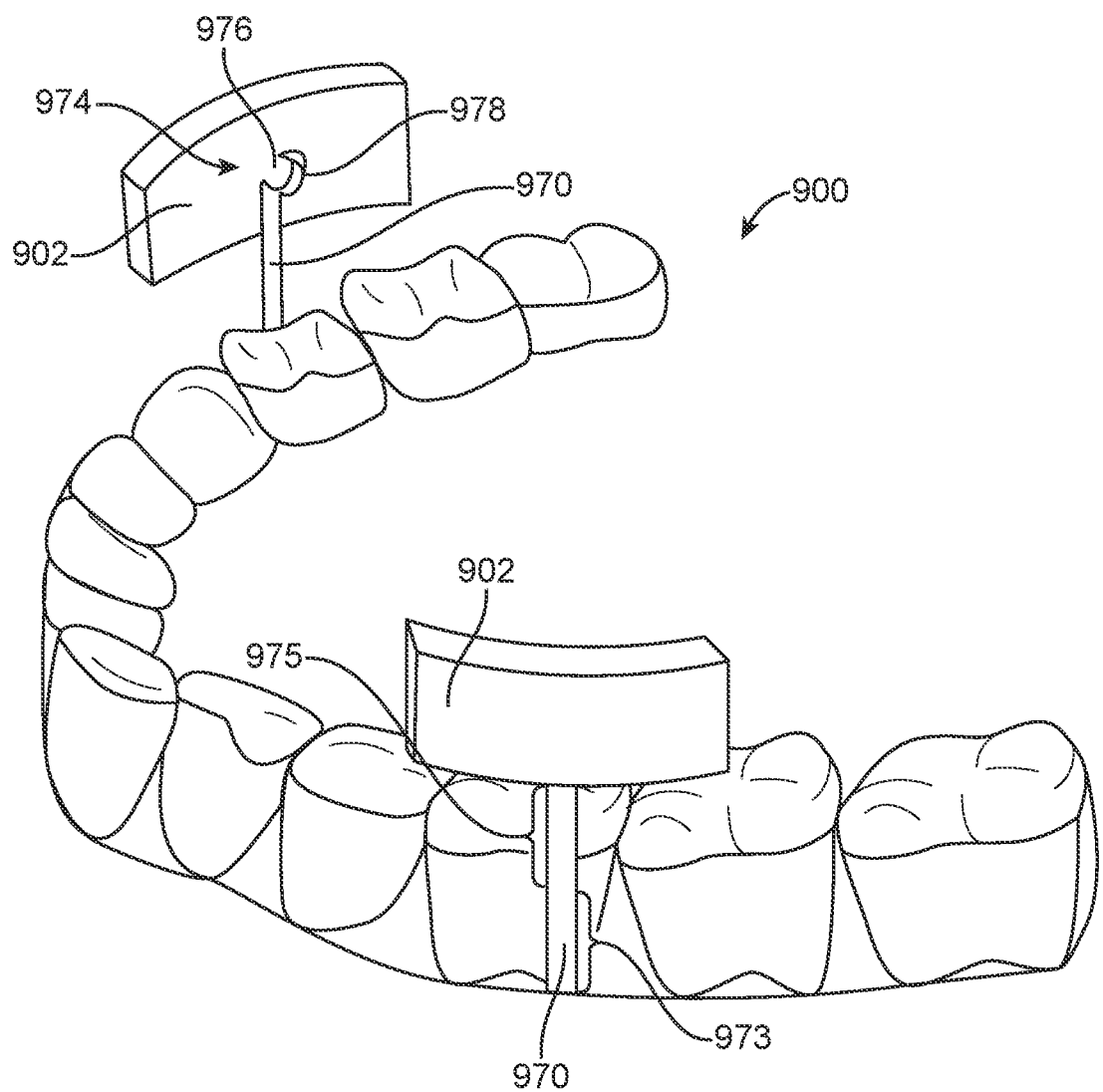
FIG. 9 depicts a class III correction appliance for the mandibular arch with lip and cheek guards, in accordance with one or more embodiments herein.

Referring now to FIG. 9, a class III correction appliance 900 with guards 902 is shown. The appliance may include features and structures similar to those of the appliance 710 shown in FIGS. 7a and 7b. For example, as with the appliance 710, the appliance 900 includes an arm or extension 970 with a coupling 974 at a terminal end thereof. The arm 970 also extends from a buccal surface of the appliance 900, for example at the buccal wall of the canine tooth receiving cavity. The arm 970 extends upwards beyond the occlusal surfaces of the appliance 900. In some embodiments, the arm extends beyond the occlusal plane of the patent when the appliance 900 is installed on the patient. The arm 970 may include both an anchored portion 973, that is coupled or integral to the buccal surface of the appliance 900 and a cantilevered portion 975 that extends away from the appliance 900.

The coupling 974 may be located at the terminal or distal end of the arm 970. The coupling 974 may be shaped to receive an elastic or a portion of an elastic. The coupling 974 may include one or more include hook shaped finger extensions 978 on one or both sides of a receptacle 976. The finger extensions 978 in combination with the receptacle 976 aid in positing an end of the elastic 918 at a particular location in space relative to the patient's jaw or relative to one or more of the appliances.

As shown in FIG. 9, the appliance 900 includes one or more guards 902 at the distal ends of the arms 970. During class III malocclusion correction, the upper teeth are advanced forward, however, the upper lip and cheeks that come in contact with the teeth of the upper arch can impart forces on the teeth that counter act the forces applied to the teeth to correct the class III malocclusion. The guards 902 are shaped such that they hold the lips and cheeks away from the teeth of the upper arch of the patient and transfer the forces of the lips to the lower arch or elsewhere, thereby relieving the upper arch of the forces that would otherwise be applied thereto, such that growth of the maxilla is less restrained. Such a configuration allows the maxillary arch to move without being subjected to the all the forces of the lips and cheeks.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for correcting malocclusions of a patient comprising:
   a maxillary appliance having tooth receiving cavities shaped to receive teeth of the maxilla and a first coupling disposed at a first distance away from an occlusal plane towards the gingival line of the patient, wherein the first coupling is configured for receiving an elastic;
   a mandibular appliance having tooth receiving cavities shaped to receive teeth of the mandible; and
   a corrective appliance having (i) a first mount shaped to engage with the mandibular appliance of the patient at a first location and having a second coupling shaped to receive the elastic, and (ii) a second mount shaped to engage with the mandibular appliance of the patient at a second location; wherein the first location and the second location are of respective first and second canines of the patient.

2. The system of claim 1, wherein the second coupling is at the first distance away from the occlusal plane towards the gingival line of the patient.

3. The system of claim 1, wherein:
the first coupling is located at the first distance away from the occlusal plane towards the gingival line of the patient and the second coupling is located a second distance above the occlusal plane of the patient, the first distance being equal to the second distance.

4. The system of claim 1, wherein:
the first coupling is located the first distance away from the occlusal plane towards the gingival line of the patient and the second coupling is located a second distance away from the occlusal plane towards the gingival line of the patient, the first distance being greater than the second distance.

5. The system of claim 1, further comprising:
a bridge extending between and connecting the first mount and the second mount, the bridge having a surface shaped to match a lingual facing anterior surface of the patient's mandibular arch.

6. The system of claim 1, further comprising:
a guard attached to the second coupling and shaped to displace the lips or the cheeks of the patient away from the teeth of the patient.

7. The system of claim 1, further comprising:
a first maxillary device extending from a buccal surface of the maxillary appliance and having a first engagement surface; and
a second mandibular device extending from a buccal surface of the mandibular appliance and having an engagement surface, wherein the engagement of the first engagement surface with the second engagement surface advances the maxilla of the patient in an anterior direction.

8. The system of claim 1, further comprising:
an arm extending from the first mount to a position away from the occlusal surface of the first mounts towards the gingival line, the second coupling located at a terminal end of the arm.

9. The system of claim 1, wherein:
the tooth receiving cavities of the maxillary appliance are shaped to reposition at least one tooth of the maxillary arch; and
the tooth receiving cavities of the mandibular appliance are shaped to reposition at least one tooth of the mandibular arch.

10. The system of claim 1, wherein:
the corrective appliance is shaped to releasable couple to the mandibular appliance.

11. The system of claim 1, wherein:
the corrective appliance is shaped to resist removal from the mandibular appliance.

12. The system of claim 1, wherein the second coupling further comprises a receptacle.

13. The system of claim 12, wherein the second coupling further comprises a finger extension on a side of the receptacle.

14. The system of claim 13, wherein the finger extension and the receptable position the elastic at a particular location relative to the patient's jaw.

15. The system of claim 13, wherein the finger extension and the receptable position the elastic at a particular location relative to one or more of the maxillary appliance, the mandibular appliance, and the corrective appliance.

16. The system of claim 1, wherein in the first coupling or the second coupling comprise a hook shaped extension.

17. The system of claim 1, wherein the first mount or the second mount comprises a semicircular cross-sectional shape.

18. The system of claim 1, wherein the corrective appliance is formed indirectly through a thermoforming process.

19. The system of claim 1, wherein the corrective appliance is formed through directly fabrication by extruding polymeric material in a layer-by-layer fashion.

20. The system of claim 19, wherein the polymeric material is selected from the group consisting of a styrenic block copolymer, a silicone rubber, an elastomeric alloy, a thermoplastic elastomer, a thermoplastic vulcanizate elastomer, a polyurethane elastomer, a block copolymer elastomer, a polyolefin blend elastomer, a thermoplastic co-polyester elastomer, a thermoplastic polyamide elastomer, or a combination thereof.

* * * * *